(12) United States Patent
Thomsen et al.

(10) Patent No.: US 8,119,199 B2
(45) Date of Patent: *Feb. 21, 2012

(54) METHOD OF MAKING WINDOW UNIT

(75) Inventors: Scott V. Thomsen, Milford, MI (US);
Vijayen S. Veerasamy, Farmington Hills, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/923,109

(22) Filed: Sep. 2, 2010

(65) Prior Publication Data

US 2011/0000602 A1    Jan. 6, 2011

Related U.S. Application Data

(60) Continuation of application No. 11/523,014, filed on Sep. 19, 2006, now Pat. No. 7,803,427, which is a division of application No. 10/073,266, filed on Feb. 13, 2002, now abandoned.

(51) Int. Cl.
*B05D 3/00* (2006.01)

(52) U.S. Cl. ............ 427/271; 427/249.7; 427/532; 427/904; 427/905; 427/906; 156/100; 156/101; 156/106; 156/109

(58) Field of Classification Search .......... 156/100, 156/101, 106, 109; 427/249.7, 271, 532, 427/904–906

See application file for complete search history.

(56) References Cited

U.S. PATENT DOCUMENTS

| | | | |
|---|---|---|---|
| 3,682,528 A | 8/1972 | Apfel et al. |
| 4,341,576 A | 7/1982 | Lewis |
| 4,882,827 A | 11/1989 | Kusumi et al. |
| 4,898,790 A | 2/1990 | Finley |
| 5,376,455 A | 12/1994 | Hartig et al. |
| 5,377,045 A | 12/1994 | Wolfe et al. |
| 5,506,038 A | 4/1996 | Knapp et al. |
| 5,508,092 A | 4/1996 | Kimock et al. |
| 5,514,476 A | 5/1996 | Hartig et al. |
| 5,527,596 A | 6/1996 | Kimock et al. |
| 5,557,462 A | 9/1996 | Hartig et al. |
| 5,635,245 A | 6/1997 | Kimock et al. |
| 5,688,585 A | 11/1997 | Lingle et al. |

(Continued)

FOREIGN PATENT DOCUMENTS

EP    0 605 814    7/1994

(Continued)

OTHER PUBLICATIONS

U.S. Appl. No. 11/523,014, filed Sep. 19, 2006, Thomsen et al.

(Continued)

*Primary Examiner* — Christopher Schatz
(74) *Attorney, Agent, or Firm* — Nixon & Vanderhye P.C.

(57) ABSTRACT

A method of making a window unit is provided which may result in improved yields. In certain example embodiments, the method involves coating a substrate with both (i) a solar control/management coating, and (ii) a protective layer (e.g., of or including diamond-like carbon (DLC)) over the solar control/management coating. The protective layer protects the coated substrate from scratches and/or the like during processing prior to heat treatment. Then, during heat treatment, the protective layer(s) is burned off in part or in whole. Following heat treatment, the coated article (substrate with solar control/management coating thereon) is coupled to another substrate in order to form the window unit.

7 Claims, 5 Drawing Sheets

U.S. PATENT DOCUMENTS

| | | |
|---|---|---|
| 5,770,321 A | 6/1998 | Hartig et al. |
| 5,800,933 A | 9/1998 | Hartig et al. |
| 5,821,001 A | 10/1998 | Arbab et al. |
| 5,902,505 A | 5/1999 | Finley |
| 5,942,338 A | 8/1999 | Arbab et al. |
| 6,001,462 A | 12/1999 | Purvis et al. |
| 6,059,909 A | 5/2000 | Hartig et al. |
| 6,060,178 A * | 5/2000 | Krisko .......... 428/627 |
| 6,132,881 A | 10/2000 | Hartig et al. |
| 6,159,607 A | 12/2000 | Hartig et al. |
| 6,180,247 B1 | 1/2001 | Szczyrbowski et al. |
| 6,261,672 B1 | 7/2001 | de Paoli |
| 6,261,693 B1 | 7/2001 | Veerasamy |
| 6,280,847 B1 | 8/2001 | Corkhill et al. |
| 6,303,225 B1 | 10/2001 | Veerasamy |
| 6,303,226 B2 | 10/2001 | Veerasamy |
| 6,335,086 B1 | 1/2002 | Veerasamy |
| 6,514,620 B1 | 2/2003 | Lingle et al. |
| 6,576,349 B2 | 6/2003 | Lingle et al. |
| 6,592,992 B2 | 7/2003 | Veerasamy |
| 6,592,993 B2 | 7/2003 | Veerasamy |
| 6,625,875 B2 | 9/2003 | Sol |
| 6,632,491 B1 | 10/2003 | Thomsen et al. |
| 6,663,753 B2 | 12/2003 | Veerasamy et al. |
| 6,770,321 B2 | 8/2004 | Kukari et al. |
| 6,827,977 B2 | 12/2004 | Veerasamy |
| 7,067,175 B2 * | 6/2006 | Veerasamy .......... 427/249.7 |
| 7,803,427 B2 * | 9/2010 | Thomsen et al. .......... 427/249.7 |
| 7,833,574 B2 * | 11/2010 | Murphy et al. .......... 427/165 |
| 2002/0001718 A1 | 1/2002 | Veerasamy |
| 2002/0176988 A1 | 11/2002 | Medwick et al. |

FOREIGN PATENT DOCUMENTS

| | | |
|---|---|---|
| WO | WO 00/66506 | 11/2000 |
| WO | WO 03/033427 | 4/2003 |

OTHER PUBLICATIONS

U.S. Appl. No. 10/073,266, filed Feb. 13, 2002, Thomsen et al.

XP-000992913 "Preparation and Properties of Highly Tetrahedral Hydrogenated Amorphous Carbon", Weiler et al., Jan. 15, 1996, pp. 1594-1608.

US 2002/0176988, Medwick et al., published Nov. 28, 2002.

* cited by examiner

METHOD OF MAKING WINDOW UNIT

This application is a continuation of application Ser. No. 11/523,014, filed Sep. 19, 2006, now U.S. Pat. No. 7,803,427 which is a divisional of Ser. No. 10/073,266, filed Feb. 13, 2002, the entire contents of which are hereby incorporated herein by reference in this application.

This invention relates to a method of making a window unit (e.g., IG window unit). More particularly, this invention relates to a method of making a window unit in which a temporary protective layer (e.g., of or including diamond-like carbon (DLC)) is provided over a solar control coating so that the coated article can be protected from scratches or the like during processing, with the temporary protective layer subsequently being burned off during heat treatment (e.g., thermal tempering or heat bending) prior to use of the final resulting product.

BACKGROUND OF THE INVENTION

Insulating glass (IG) window units typically include first and second glass substrates spaced apart from one another via at least one spacer so as to define a gap therebetween. For example, see U.S. Pat. No. 5,557,462. The gap between the glass substrates may or may not be evacuated and/or filled with gas in different instances. As in the '462 patent, one of the glass substrates of the IG window unit is often coated with a solar control/management coating (e.g., a low-E coating). Solar control/management coatings typically include at least one layer (e.g., of or including Ag, Au, NiCr, and/or the like) that reflects infrared (IR) and/or ultraviolet (UV) radiation. Example solar control/management coatings may be found, for example and without limitation, in any of U.S. Pat. Nos. 3,682,528; 4,898,790; 5,376,455; 5,377,045; 5,514,476; 5,557,462; 5,688,585; 5,770,321; 5,902,505; 5,942,338; 6,059,909; 6,060,178; 6,132,881; or 6,159,607.

IG window units are typically made in the following manner. A first glass substrate is coated (e.g., via sputtering or the like) with a solar control/management coating, and processed as follows. The coated glass substrate may be shipped (e.g., via truck, train, ship, plane, or the like) from the coating facility to an IG manufacturing facility, and put in inventory using a forklift or the like. Subsequently, a forklift may move the coated substrate from its inventory location to a cut-down line where the coated substrate is cut to size. The cut coated substrate may then be seamed, washed, and heat treated (e.g., thermally tempered). Thereafter, the coated substrate is coupled to another glass substrate via at least one spacer so as to form an IG window unit.

Unfortunately, during the course of such processing between coating and heat treatment, the coated substrate is moved on numerous occasions and is subject to damage (e.g., scratching). Low-E coatings are often soft and tend to be prone to damage in this regard such as scratching. Yields have been found to suffer due to coated substrates which are damaged (e.g., scratched or otherwise rendered non-useable) between coating and heat treatment.

In view of the above, it will be appreciated by those skilled in the art that there exists a need in the art for an improved method of making window units (e.g., IG units, vehicle windshields, and/or the like) which include at least one coated substrate.

BRIEF SUMMARY OF THE INVENTION

An object of this invention is to provide an improved method of making insulating glass (IG) window units.

Another object of this invention is to provide an improved method of making vehicle windshields. The method is also applicable to other types of windows, monolithic and/or laminated.

Another object of this invention is to provide a method of making a window unit (e.g., IG unit and/or vehicle windshield) which results in improved yields. In certain example embodiments of this invention, the method involves coating a substrate with both (i) a solar control/management coating, and (ii) at least one protective layer (e.g., of or including diamond-like carbon (DLC)) over the solar control/management coating. The protective layer(s) protects the coated substrate from scratches and/or the like during processing prior to heat treatment (HT). Then, during heat treatment, the protective layer(s) is burned off in part or in whole. Following heat treatment, the coated article (substrate with solar control/management coating thereon) is coupled to another substrate in order to form the window unit.

Another object of this invention is to fulfill one or more of the above-listed objects and/or needs.

Certain example embodiments of this invention fulfill one or more of the above-listed objects and/or needs by providing a method of making a window unit, the method comprising: providing a solar control coating on a glass substrate; depositing a temporary protective layer on the glass substrate over the coating, the temporary protective layer having an average hardness of at least 10 GPa; heat treating the substrate with the coating and protective layer thereon at a temperature of at least 570 degrees C. so that the protective layer burns off; and following said heat treating, coupling the glass substrate with the coating thereon to another substrate in order to form the window unit.

Other example embodiments of this invention fulfill one or more of the above-listed objects and/or needs by providing a method of making a window unit, the method comprising: providing a coating on a class substrate, the coating including at least one layer comprising Ag; depositing a protective layer comprising diamond-like carbon (DLC) on the substrate over the coating; heat treating the substrate with the coating and protective layer thereon so that the protective layer comprising diamond-like carbon (DLC) at least partially burns off during the heat treating; and following said heat treating, coupling the glass substrate with the coating thereon to another substrate in order to form the window unit.

DETAILED DESCRIPTION OF EXAMPLE EMBODIMENTS OF THE INVENTION

Figure 1:
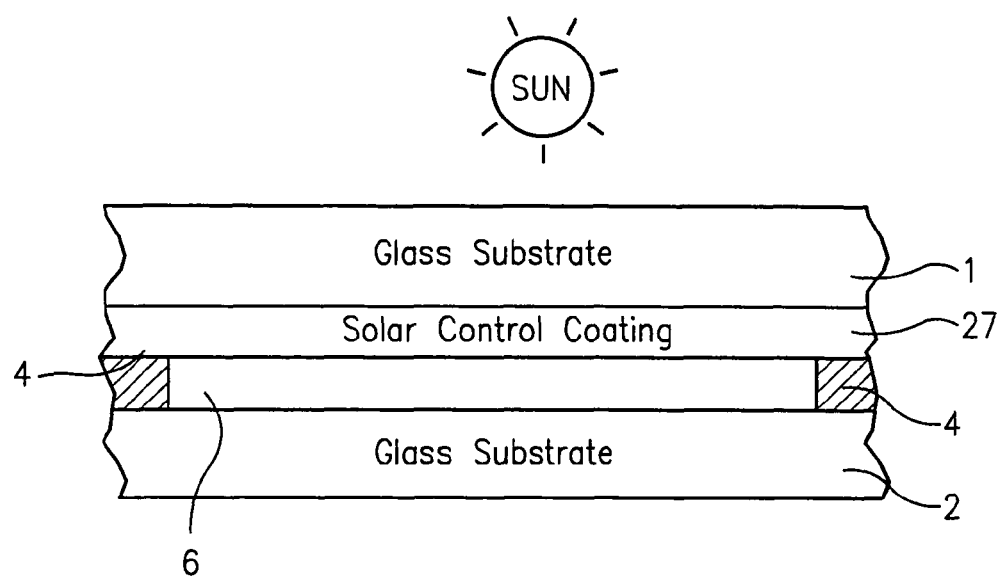
FIG. 1 is a cross sectional view of an IG window unit according to an example embodiment of this invention.

Referring now more particularly to the accompanying drawings in which like reference numerals refer to like parts/layers throughout the several views. The instant invention relates to methods of making window units including but not limited to insulating glass (IG) window units and vehicle windshields. Initially, before describing methods according to example embodiments of the instant invention, reference is made to FIGS. 1-2 which illustrate example window units which may be made according to different example embodiments of this invention.

FIG. 1 is a cross sectional view of an insulating glass (IG) window unit which may be made in certain example embodiments of this invention. The IG window unit includes first glass substrate 1 and second glass substrate 2 which are spaced apart from one another by one or more spacers 4. Each of substrates 1 and 2 is from about 1.0 to 10.0 mm thick, more preferably from about 1.8 mm to 4 mm thick. Spacer(s) 4 may be provided around the edge/periphery of the window unit as in conventional IG window units, or alternatively may be provided in an array throughout the viewing area of the window unit as in vacuum IG window units. Spacer(s) 4 function to space the substrates 1 and 2 from one another so as to define space 6 therebetween. Space 6 may be at atmospheric pressure or lower in different embodiments of this invention, and may or may not be filled with gas. While substrates 1 and 2 are of glass in preferred embodiments of this invention, they may be of other materials such as plastic in alternative embodiments of the invention. The IG window unit of FIG. 1 has a visible transmission of at least about 30% in certain example embodiments of this invention, more preferably at least about 60%, and most preferably at least about 70%.

Figure 2:
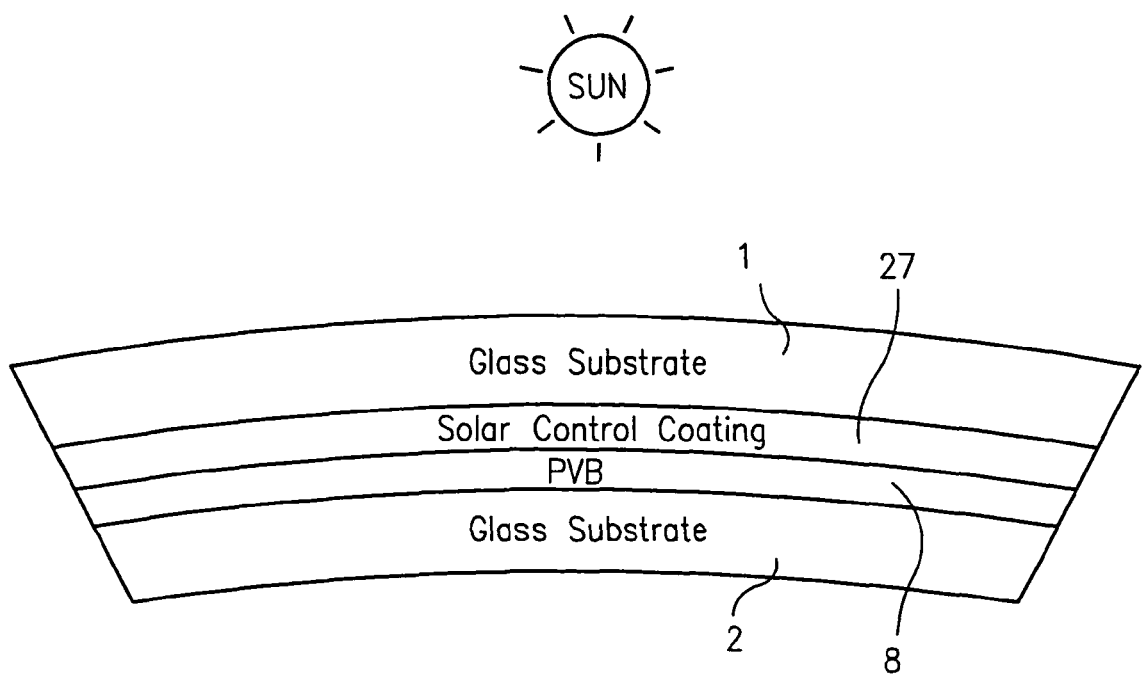
FIG. 2 is a cross sectional view of a vehicle windshield according to an example embodiment of this invention.

FIG. 2 is a cross sectional view of a vehicle windshield which may be made in certain example embodiments of this invention. The windshield includes first glass substrate 1 and second glass substrate 2 that are laminated together via a polymer inclusive interlayer 8. Interlayer 8 may be of or include polyvinyl butyral (PVB), polyvinyl chloride, polypropylene, polyethylene, polyurethane, or any other suitable laminating material. The windshield of FIG. 2 preferably has a visible transmission of at least 70%, more preferably of at least 75%.

Still referring to FIGS. 1-2, each of these window units includes at least one solar control/management coating 27 for reflecting certain amounts of infrared (IR) and/or ultraviolet (UV) radiation. While coating 27 is provided on the interior surface of substrate 1 in FIGS. 1-2, the coating 27 may instead be provided on the interior surface of the other substrate 2 in alternative embodiments of this invention. Moreover, in other embodiments of this invention it is possible to provide a solar control/management coating 27 on each of substrates 1-2. Coating 27 may include one or more layers in different embodiments of this invention, although a multi-layered coating 27 is preferred.

Figure 5:
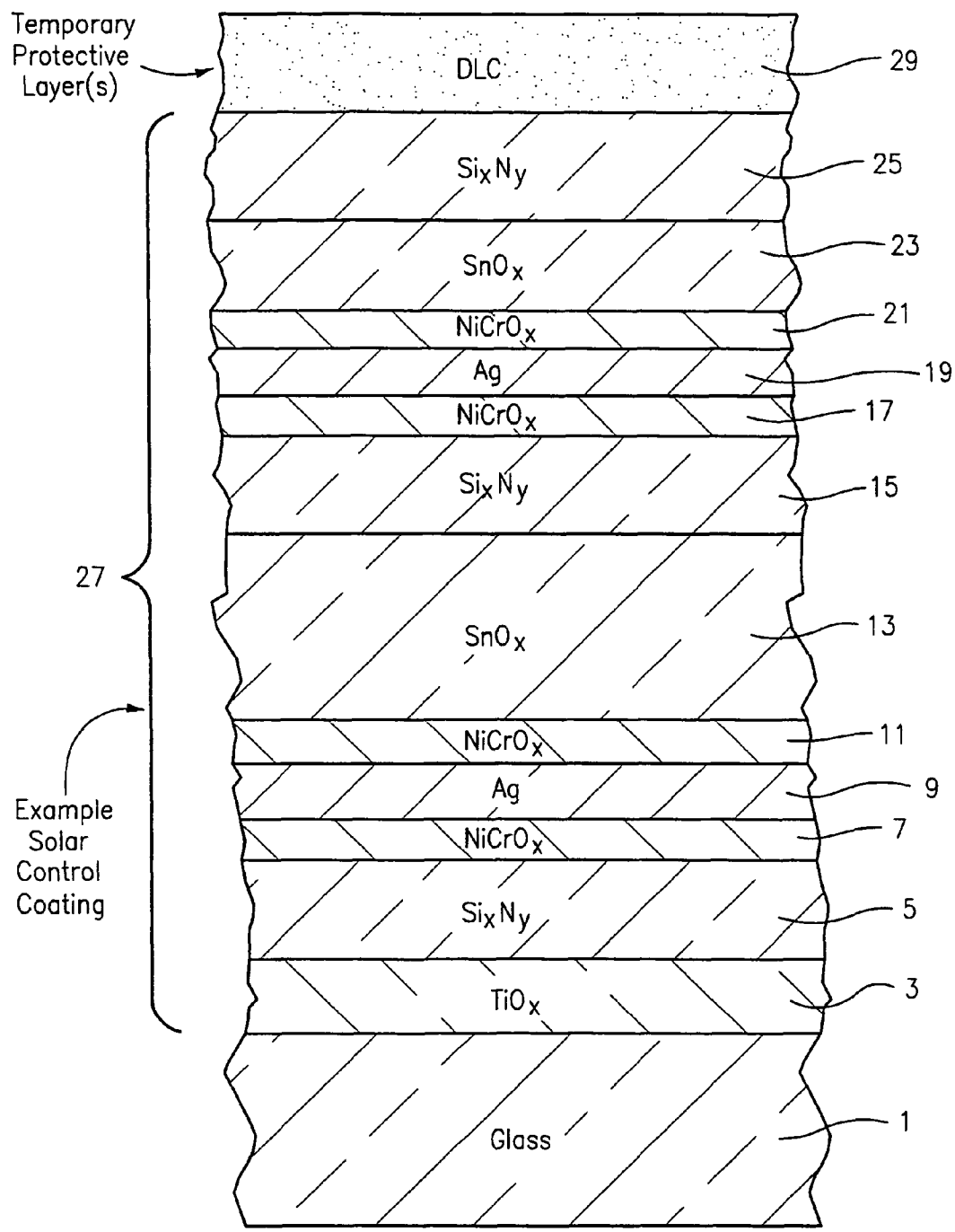
FIG. 5 is a cross sectional view of a coated substrate at a point in time during the manufacturing process according to an example embodiment of this invention, at which point in time the substrate is coated with both a solar control coating and a temporary protective layer(s) (the precise illustrated coating is provided for purposes of example only).
Figure 6:
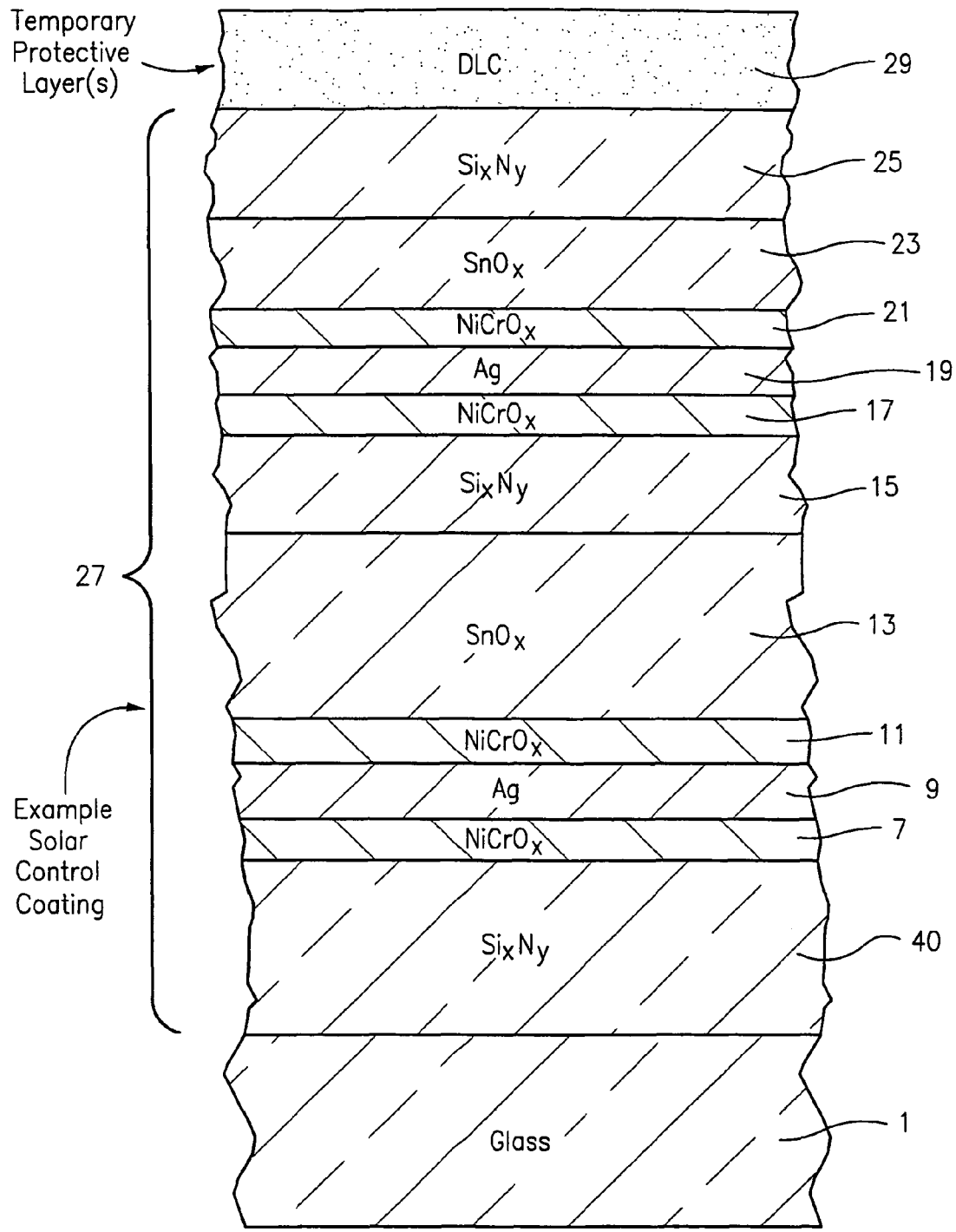
FIG. 6 is a cross sectional view of a coated substrate at a point in time during the manufacturing process according to another example embodiment of this invention, at which point in time the substrate is coated with both a solar control coating and a temporary protective layer(s) (this precise illustrated coating is provided for purposes of example only).

The phrases "solar control coating" and "solar management coating" herein mean that the coating includes at least one layer of a material (e.g., Ag, Au, and/or NiCr) that functions to reflect certain amounts of UV and/or IR radiation. Example solar control coatings 27 are shown in FIGS. 5-6. Moreover, solar control coating 27 may comprise any of the coatings described and/or illustrated in any of U.S. Pat. Nos. 3,682,528; 4,898,790; 5,376,455; 5,377,045; 5,514,476; 5,557,462; 5,688,585; 5,770,321; 5,902,505; 5,942,338; 6,059,909; 6,060,178; 6,132,881; or 6,159,607, or may comprise any other suitable solar control coating.

Figure 3A:
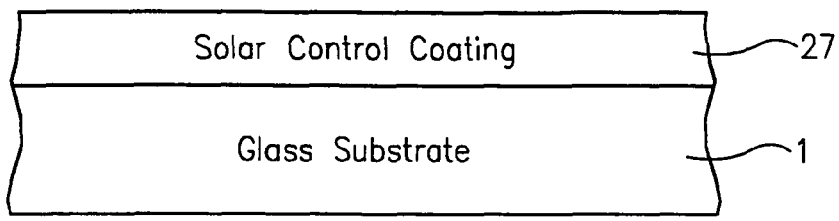
FIGS. 3(a), 3(b), 3(c) and 3(d) are cross sectional views progressively illustrating how a window unit is made according to an example embodiment of this invention.
Figure 3B:
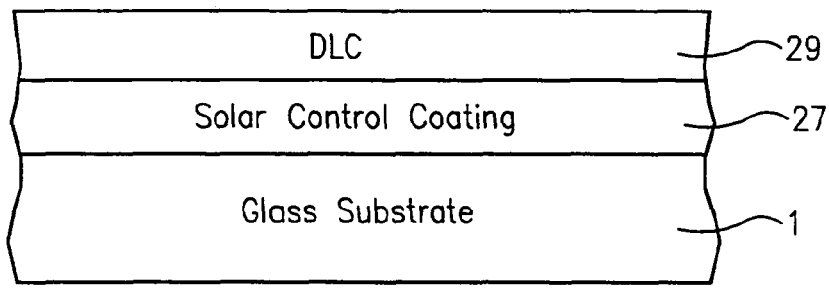
Figure 3C:
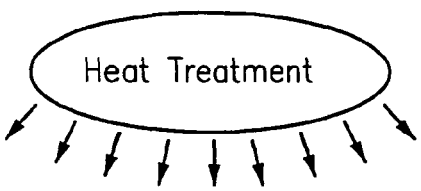
Figure 3C:
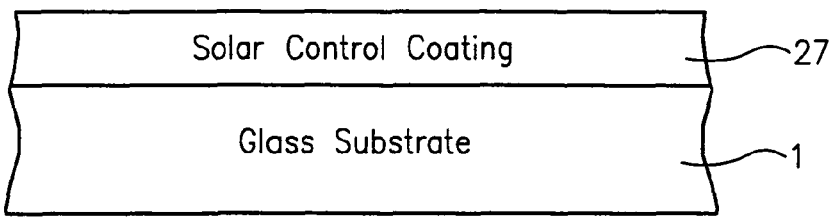
Figure 3D:
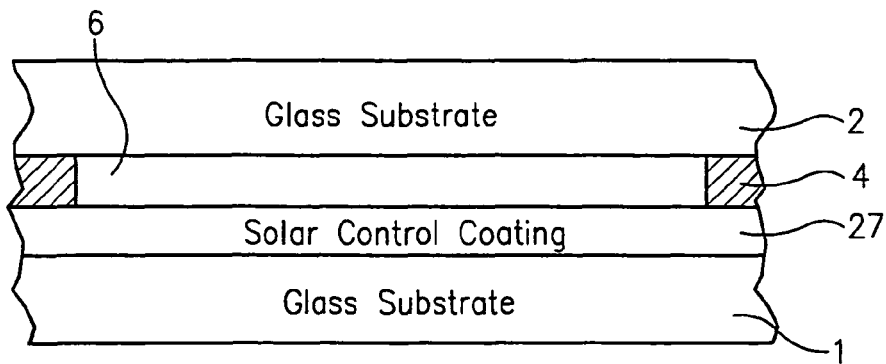
Figure 4:
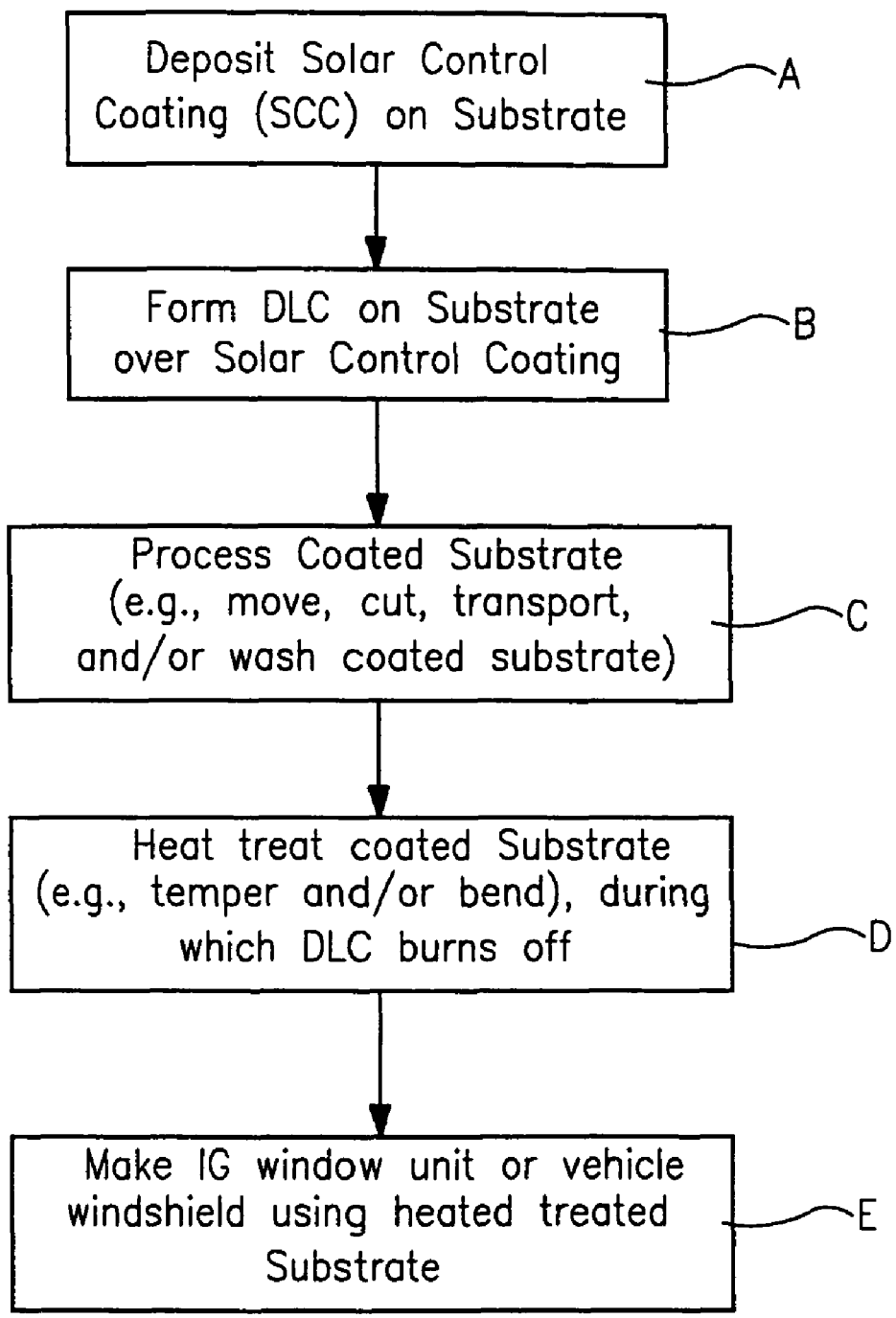
FIG. 4 is a flowchart illustrating steps showing how a window unit is made according to an example embodiment of this invention.

FIGS. 3-4 illustrate a method of making a window unit (e.g., IG unit or windshield) according to an example embodiment of this invention. In this regard, for purposes of example, a process for making an IG window unit according to an example embodiment of this invention will now be described.

As shown in FIG. 3($a$), a first glass substrate 1 (e.g., soda-lime-silica glass, borosilicate glass, or any other suitable type of glass) is coated with a solar control/management coating 27 (see step A in FIG. 4). Coating 27 may be deposited on substrate 1 via sputtering or any other suitable technique. Thereafter, as shown in FIG. 3($b$), at least one temporary protective layer 29 is deposited on the substrate 1 over solar control/management coating 27 (see step B in FIG. 4). Protective layer(s) 29 may or may not directly contact coating 27 in different embodiments of this invention (i.e., other layer(s) may be provided between coating 27 and layer 29). Layer 29 may be from about 5 to 3,000 Å thick in certain example embodiments of this invention, more preferably from about 10-1,000 Å thick, and most preferably from about 25 to 200 Å thick.

In certain example embodiments of this invention, temporary protective layer(s) 29 is of or includes diamond-like carbon (DLC). The DLC inclusive layer(s) 29 may be deposited on substrate 1 over coating 27 using an ion beam source, or any other suitable technique. For example, any of the DLC layer(s) (and corresponding deposition techniques) disclosed in any of U.S. Pat. Nos. 6,335,086, 6,261,693, 6,303,225, 6,303,226, 5,635,245, 5,527,596, or 5,508,092 (all hereby incorporated herein by reference) may be used to form layer (s) 29. Alternatively, any other suitable type of DLC may be used in layer(s) 29 in other embodiments of this invention. Temporary protective layer(s) 29 may include one or more layers in different embodiments of this invention. While protective layer 29 preferably comprises DLC in certain embodiments of this invention, this invention is not so limited; in particular, layer 29 may be of or include any other suitable material that is capable of protecting coating 27 from scratching and can at least partially burn off during heat treatment.

After substrate 1 has been coated with both solar control coating 27 and DLC layer(s) 29 (see FIG. 3($b$)), the coated article may be processed (e.g., shipped, moved, cut, cleaned, seamed, washed, and/or the like) (see step C in FIG. 4). As shown in FIG. 3($c$), the coated article is then subjected to heat treatment (e.g., thermal tempering, heat bending, and/or heat strengthening); and during this heat treatment the DLC layer (s) 29 burns off either in part or entirely (see step D in FIG. 4) (it is noted that the DLC may tend to burn off at a temperature of about 400 degrees C.). Such heat treatment may, in certain example embodiments of this invention, involve heating the coated substrate to temperature(s) of at least about 570 degrees C.; more preferably from 1100° F. (593° C.) up to 1450° F. (788° C.) (more preferably from about 1100 to 1200 degrees F., and most preferably from 1150-1200 degrees F.) for a sufficient period of time (e.g., at least 1 minute, more preferably at least 5 minutes) to achieve the end result (e.g., tempering; bending, layer 29 burn-off, and/or heat strengthening). FIG. 3($c$) illustrates that after this heat treatment, much or all of the DLC inclusive layer 29 is no longer present on the coated article since it has burned off during the heat treatment.

After heat treatment (and thus after the DLC layer 29 has at least partially burned off), the coated substrate (i.e., substrate 1 with the solar control coating 27 thereon) is coupled to another substrate 2 in order to form the resulting window unit (see step E in FIG. 4). Example resulting window units are shown in FIGS. 1, 2 and 3(d).

As will be explained below, DLC is hard and serves to protect the coating 27 from scratches and the like during the processing period between the coating and heat treating stages of the manufacturing process. However, addition of the DLC layer(s) 29 to the coated article tends to reduce the visible transmission of the article. Thus, according to certain embodiments of this invention, the DLC layer(s) 29 is useful for protection purposes during the manufacturing process (its reduction in visible transmission is irrelevant during production), and it can be removed (e.g., burned off) during heat treatment. It will be appreciated that the visible transmission of the coated article increases when the DLC layer(s) 29 is burned off, prior to formation of the final window unit.

In certain example embodiments of this invention, when DLC for example is provided in temporary protective layer(s) 29, the layer(s) 29 includes has an average hardness of at least about 10 GPa, more preferably at least about 20 GPa, and most preferably from about 20-90 GPa. Such hardness renders layer (s) 29 resistant to scratching, certain solvents, and/or the like. Layer 29 may, in certain example embodiments where DLC is used, include more sp$^3$ carbon-carbon (C—C) bonds than sp$^2$ carbon-carbon (C—C) bonds. In certain example embodiments at least about 50% of the carbon-carbon bonds in the layer 29 may be sp$^3$ carbon-carbon (C—C) bonds, more preferably at least about 60% of the carbon-carbon bonds in the layer 29 may be sp$^3$ carbon-carbon (C—C) bonds, and most preferably at least about 70% of the carbon-carbon bonds in the layer 29 may be sp$^3$ carbon-carbon (C—C) bonds. In such embodiments, the DLC may be a special type of DLC known as highly tetrahedral amorphous carbon (ta-C) (which may or may not be hydrogenated or otherwise doped) (e.g., see U.S. Pat. No. 6,261,693, which is incorporated herein by reference). In certain example embodiments, the DLC may have a density of at least about 2.4 gm/cm$^3$, more preferably of at least about 2.7 gm/cm$^3$. Example linear ion beam sources that may be used to deposit DLC inclusive layer 29 on substrate 1 include any of those in any of U.S. Pat. Nos. 6,261,693, 6,002,208, 6,335,086, or 6,303,225 (all incorporated herein by reference). When using an ion beam source to deposit layer(s) 29, hydrocarbon feedstock gas(es) (e.g., C$_2$H$_2$), HMDSO, or any other suitable gas, may be used in the ion beam source in order to cause the source to emit an ion beam toward substrate 1 for forming layer(s) 29 over coating 27. It is noted that the hardness and/or density of layer(s) 29 may be adjusted by varying the ion energy of the depositing apparatus.

As discussed above, any suitable type of solar control coating 27 may be used in different embodiments of this invention. For purposes of example, and without limitation, two example solar control coatings 27 are illustrated in FIGS. 5-6. Each of FIGS. 5 and 6 shows an example solar control coating 27 provided on a substrate between the substrate 1 and the DLC inclusive temporary protective layer 29 (i.e., at the FIG. 3(b) stage of the manufacturing process).

The example solar control coating 27 according to the FIG. 5 embodiment includes first dielectric layer 3, second dielectric layer 5, first lower contact layer 7 (which contacts layer 9), first conductive metallic infrared (IR) reflecting layer 9, first upper contact layer 11 (which contacts layer 9), third dielectric layer 13 (which may be deposited in one or multiple steps in different embodiments of this invention), fourth dielectric layer 15, second lower contact layer 17 (which contacts layer 19), second conductive metallic IR reflecting layer 19, second upper contact layer 21 (which contacts layer 19), fifth dielectric layer 23, and finally sixth protective dielectric layer 25. The "contact" layers each contact at least one IR reflecting layer. The aforesaid layers make up heat treatable low-E (i.e., low emissivity) coating 27 which is provided on substrate 1. The coating 27 is preferably deposited on substrate 1 via sputtering, although other deposition techniques may also be used.

In certain examples embodiments, the coating 27 according to the FIG. 5 embodiment may be as in the Table 1 below.

TABLE 1

(Example Materials/Thicknesses; FIG. 5 Embodiment)

| Layer | Preferred Range (Å) | More Preferred (Å) | Example (Å) |
|---|---|---|---|
| TiO$_2$ (layer 3) | 0-400 Å | 50-250 Å | 100 Å |
| Si$_x$N$_y$ (layer 5) | 0-400 Å | 50-250 Å | 170 Å |
| NiCrO$_x$ (layer 7) | 5-100 Å | 10-50 Å | 18 Å |
| Ag (layer 9) | 50-250 Å | 80-120 Å | 105 Å |
| NiCrO$_x$ (layer 11) | 5-100 Å | 10-50 Å | 16 Å |
| SnO$_2$ (layer 13) | 0-800 Å | 500-850 Å | 650 Å |
| Si$_x$N$_y$ (layer 15) | 0-800 Å | 50-250 Å | 170 Å |
| NiCrO$_x$ (layer 17) | 5-100 Å | 10-50 Å | 18 Å |
| Ag (layer 19) | 50-250 Å | 80-120 Å | 105 Å |
| NiCrO$_x$ (layer 21) | 5-100 Å | 10-50 Å | 16 Å |
| SnO$_2$ (layer 23) | 0-500 Å | 100-300 Å | 150 Å |
| Si$_3$N$_4$ (layer 25) | 0-500 Å | 100-300 Å | 250 Å |

FIG. 6 illustrates a low-E heat treatable coating 27 according to another embodiment of this invention. The FIG. 6 coating 27 is the same as the FIG. 5 coating described above, except that either (i) dielectric layer 3 is removed, or (ii) layers 3 and 5 are replaced with a single silicon nitride layer 40. Silicon nitride layer 40 may be of or include Si$_3$N$_4$ in certain embodiments of this invention. In other embodiments, silicon nitride layer 40 may be of or include Si$_x$N$_y$, where x/y may be from about 0.65 to 0.80, or alternatively from about 0.76 to 1.5 in silicon rich embodiments. Additional details regarding the coatings 27 of FIGS. 5-6, including example sputter process parameters for forming the coatings, may be found in U.S. patent application Ser. No. 09/794,224 (hereby incorporated herein by reference).

In certain exemplary embodiments of this invention, solar control coatings 27 may have one or more of the following characteristics before/after heat treatment (HT) when in monolithic form, as set forth in Table 2:

TABLE 2

Coating 27 Monolithic Before/After Heat Treatment (HT)

| Characteristic | General | More Preferred | Most Preferred |
|---|---|---|---|
| R$_s$ (ohms/sq.)(before HT): | <=40.0 | <=20.0 | <=8.0 |
| R$_s$ (ohms/sq.)(after HT): | <=40.0 | <=20.0 | <=8.0 |
| E$_n$ (before HT): | <=0.30 | <=0.20 | <=0.08 |
| E$_n$ (after HT): | <=0.30 | <=0.20 | <=0.08 |

The example coatings 27 are provided for purposes of example and without limitations. Other suitable solar control coatings may instead be used in other embodiments of this invention. With regard to FIGS. 5-6, it is noted that each of these coatings 27 includes a pair of metallic silver (Ag) layers 9, 19 which function to reflect IR and UV radiation, in order to achieve low-E characteristics.

In certain embodiments of this invention, it is noted that other layers (e.g., a tie layer or the like) may be provided between the DLC inclusive layer 29 and coating 27. Such a layer(s) may or may not burn off along with layer 29 during heat treatment.

While the temporary layer 29 comprises DLC in many embodiments discussed above, certain embodiments of this invention are not so limited. For example, protective paint may be used instead of DLC for layer 29 in certain embodiments of this invention, can be burned off in a similar manner.

While the invention has been described in connection with what is presently considered to be the most practical and preferred embodiment, it is to be understood that the invention is not to be limited to the disclosed embodiments, but on the contrary, is intended to cover various modifications and equivalent arrangements included within the spirit and scope of the appended claims.

The invention claimed is:

1. A method of making a window unit, the method comprising:

having a coated article comprising a coating on a glass substrate, the coating comprising a layer comprising silver and at least one dielectric layer provided on the glass substrate over at least the layer comprising silver, the coated article further comprising a protective layer comprising carbon on the glass substrate over and directly contacting the dielectric layer of said coating;

heat treating the glass substrate with the coating and protective layer thereon so that the protective layer comprising carbon only partially burns off during the heat treating, so that following said heating treating part of the layer comprising carbon remains on the glass substrate.

2. The method of claim 1, wherein said heat treating comprises heating the glass substrate to a temperature of at least about 570° C.

3. The method of claim 1, wherein said heat treating comprises heating the glass substrate to a temperature of from about 590° C. to 788° C. for at least one minute in a process of thermally tempering and/or heat bending the glass substrate.

4. The method of claim 1, wherein the protective layer comprising carbon comprises DLC and has an average hardness of at least about 10 GPa.

5. The method of claim 1, wherein the protective layer comprising carbon includes more $sp^3$ carbon-carbon bonds than $sp^2$ carbon-carbon bonds.

6. The method of claim 1, wherein the coating comprises two layers comprising silver separated by at least a dielectric layer.

7. The method of claim 1, wherein the dielectric layer comprises silicon nitride.

* * * * *